United States Patent
Ansaloni

(10) Patent No.: US 6,168,045 B1
(45) Date of Patent: Jan. 2, 2001

(54) UNIT FOR ORIENTING AND SUPPLYING BOTTOM SHELLS OF MEDICINAL CAPSULES

(75) Inventor: Angelo Ansaloni, Crespellano (IT)

(73) Assignee: MG2 S.p.A., Pian Di Macina - Pianoro (IT)

(*) Notice: Under 35 U.S.C. 154(b), the term of this patent shall be extended for 0 days.

(21) Appl. No.: 09/304,340

(22) Filed: May 4, 1999

(30) Foreign Application Priority Data

May 4, 1998 (IT) .............................................. B098A0276

(51) Int. Cl.[7] ...................................................... G07F 11/00

(52) U.S. Cl. .............................................. 221/79; 221/277

(58) Field of Search .................................. 221/2, 7, 9, 15, 221/76, 79, 132, 277

(56) References Cited

U.S. PATENT DOCUMENTS 5,405,048 * 4/1995 Rogers et al. ............................. 221/79

* cited by examiner

Primary Examiner—Kenneth W. Noland
(74) Attorney, Agent, or Firm—Finnegan, Henderson, Farabow, Garrett & Dunner, L.L.P.

(57) ABSTRACT

A unit for orienting and supplying bottom shells, the unit having a drum rotating about a vertical axis and in turn having a number of seats, each for housing one bottom shell at a time; the unit also having a hopper for successively feeding a bottom shell into each seat on the drum; and an ejecting pin for successively ejecting each bottom shell from the respective seat so that the bottom shell drops inside an unloading conduit connected to the seat; the bottom shell being positioned indifferently, inside each seat, with the concavity facing inwards or outwards of the seat; and each seat being so formed that the bottom shell transferred into the unloading conduit is always oriented the same way; a pocket conveyor also being provided to pick up the succession of equioriented bottom shells issuing from the unloading conduits.

15 Claims, 3 Drawing Sheets

UNIT FOR ORIENTING AND SUPPLYING BOTTOM SHELLS OF MEDICINAL CAPSULES

The present invention relates to a unit for orienting and supplying bottom shells of medicinal capsules.

BACKGROUND OF THE INVENTION

As is known, medicinal capsules normally comprise a substantially cup-shaped bottom shell; a top shell for closing the bottom shell; and a given quantity of drug enclosed inside the bottom shell. The top and bottom shells are normally made of hard gel, which is rapidly dissolved by gastric acids to release the drug within a short time from the drug being taken.

Currently used machines for producing medicinal capsules receive the drug and the empty capsules separately at the input, and supply, at the output, a succession of capsules containing a predetermined quantity of drug.

Such machines normally comprise a pocket conveyor for feeding a succession of capsules along a path extending through a supply station where the empty capsules are oriented and inserted successively inside the pockets on the conveyor; a parting station where each top shell is detached from the respective bottom shell to open the capsule; a cleaning station where any processing residue is removed from inside each bottom shell; a dispensing station where a predetermined quantity of drug is fed into each bottom shell; a closing station where each top shell is put back onto the respective bottom shell; and, finally, a pickup station where the medicinal capsules are removed off the pocket conveyor.

The marketing of new types of controlled-release medicinal capsules, however, now calls for supplying production machines separately with the drug and the top and bottom shells. To do this, various units for orienting and supplying the bottom shells have been devised, but which are relatively complex and fail to provide for a sufficiently high hourly output rate.

SUMMARY OF THE INVENTION

It is an object of the present invention to provide a unit for orienting and supplying bottom shells, which is straightforward and cheap to produce, and which provides for a higher hourly output rate than currently used units.

According to the present invention, there is provided a unit for orienting and supplying bottom shells of medicinal capsules; the unit comprising an orienting assembly for receiving the bottom shells in bulk at the input and supplying a succession of equioriented bottom shells at the output; and the unit being characterized by said orienting assembly comprising a drum, which is mounted for rotation about a first axis, has a number of seats, each for housing a bottom shell, and has a number of unloading conduits, each communicating with a respective seat and by which the bottom shell housed in the seat is conveyed outwards of the seat; the orienting assembly also comprising supply means for successively feeding into each seat on the drum a bottom shell coaxial with a second axis; and extracting means for successively ejecting each bottom shell from the respective seat and into the respective unloading conduit; said seats on the drum being so formed as to equiorient the bottom shells ejected from the seats.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
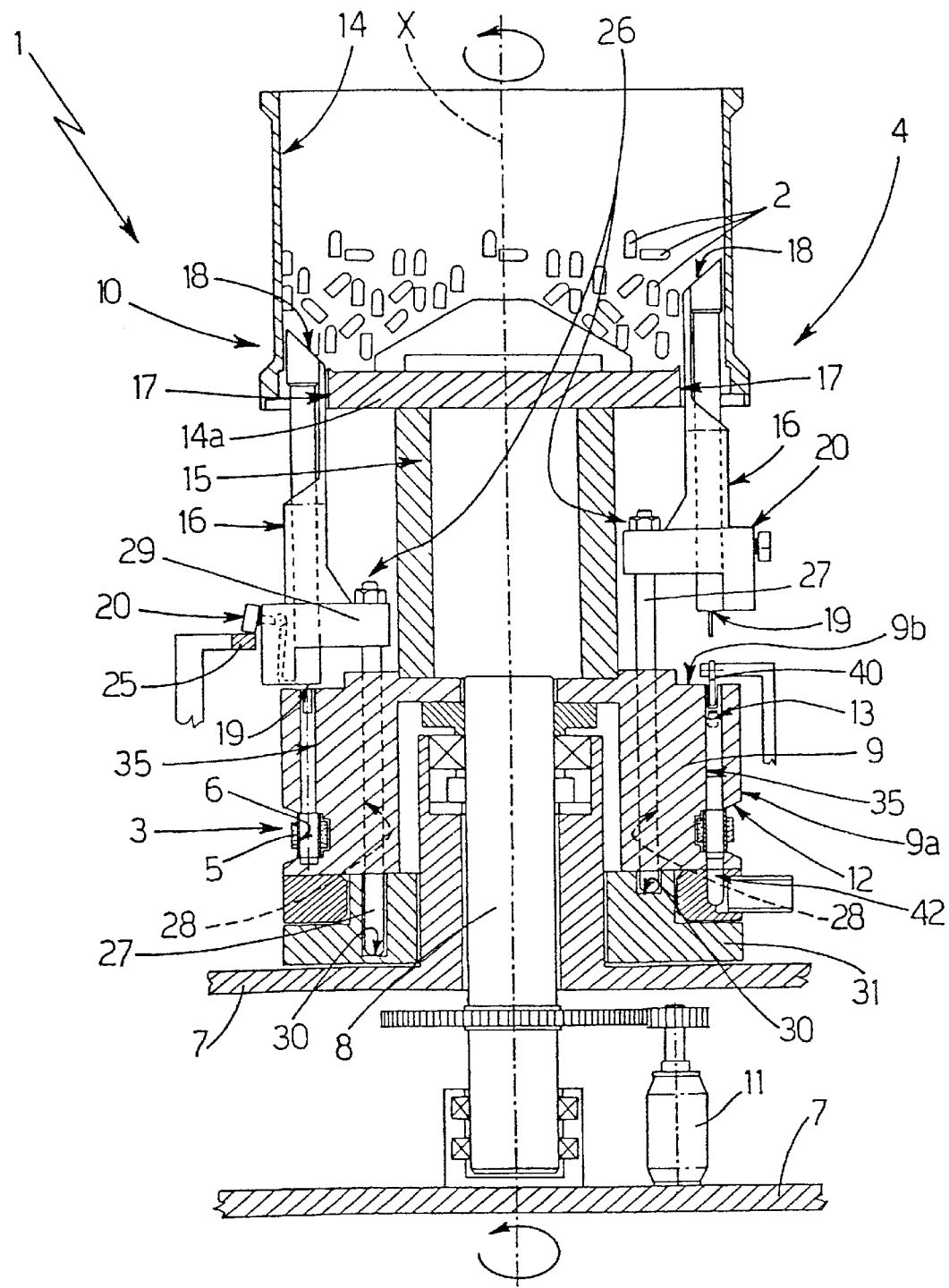
FIG. 1 shows a front view, with parts in section and parts removed for clarity, of a unit for orienting and supplying bottom shells in accordance with the teachings of the present invention.

Number 1 in FIG. 1 indicates as a whole a unit for supplying bottom shells, and which provides for receiving bottom shells 2 in bulk at the input, and for supplying, at the output, a succession of equioriented bottom shells 2 from which to subsequently produce known medicinal capsules.

Supply unit 1 comprises a pocket conveyor 3 for conveying said succession of bottom shells 2 issuing from supply unit 1; and an orienting assembly 4 for receiving bottom shells 2 in bulk at the input and successively feeding bottom shells 2 to pocket conveyor 3 so that each bottom shell 2 is housed inside a respective pocket on pocket conveyor 3.

Besides forming said succession of bottom shells 2, orienting assembly 4 also provides for so orienting bottom shells 2 that all the bottom shells 2 fed onto pocket conveyor 3 are oriented the same way inside the respective pockets on pocket conveyor 3. In the example shown, bottom shells 2 are housed inside the pockets on pocket conveyor 3 with the respective concavities of the bottom shells facing upwards.

In the example shown, pocket conveyor 3 is defined by a belt 5 made of plastic material and along which are equally spaced a number of bushes 6, each for housing a bottom shell 2 with the respective concavity of the bottom shell facing upwards.

With reference to FIG. 1, orienting assembly 4 extends coaxially with a vertical axis X, and comprises a frame 7; a supporting shaft 8 fitted to frame 7 so as to rotate axially about axis X via the interposition of known rolling bearings; an orienting drum 9 coaxial with axis X and fitted to the top end of supporting shaft 8; and a hopper 10 mounted to rotate about axis X over drum 9.

Orienting assembly 4 also comprises a drive unit 11 for rotating supporting shaft 8 and drum 9 about axis X by means of cascaded gears.

In the example shown, an annular groove 12 is formed on the cylindrical lateral surface 9a of drum 9 and defines a pulley about which belt 5 is wound; and the top surface 9b of drum 9, facing hopper 10, has a number of angularly equally spaced seats 13 close to the peripheral edge of drum 9. As explained in more detail later on, each seat 13 houses one bottom shell 2 at a time, and is so formed as to orient bottom shell 2 with the concavity facing upwards when bottom shell 2 is ejected from seat 13.

Figure 3:
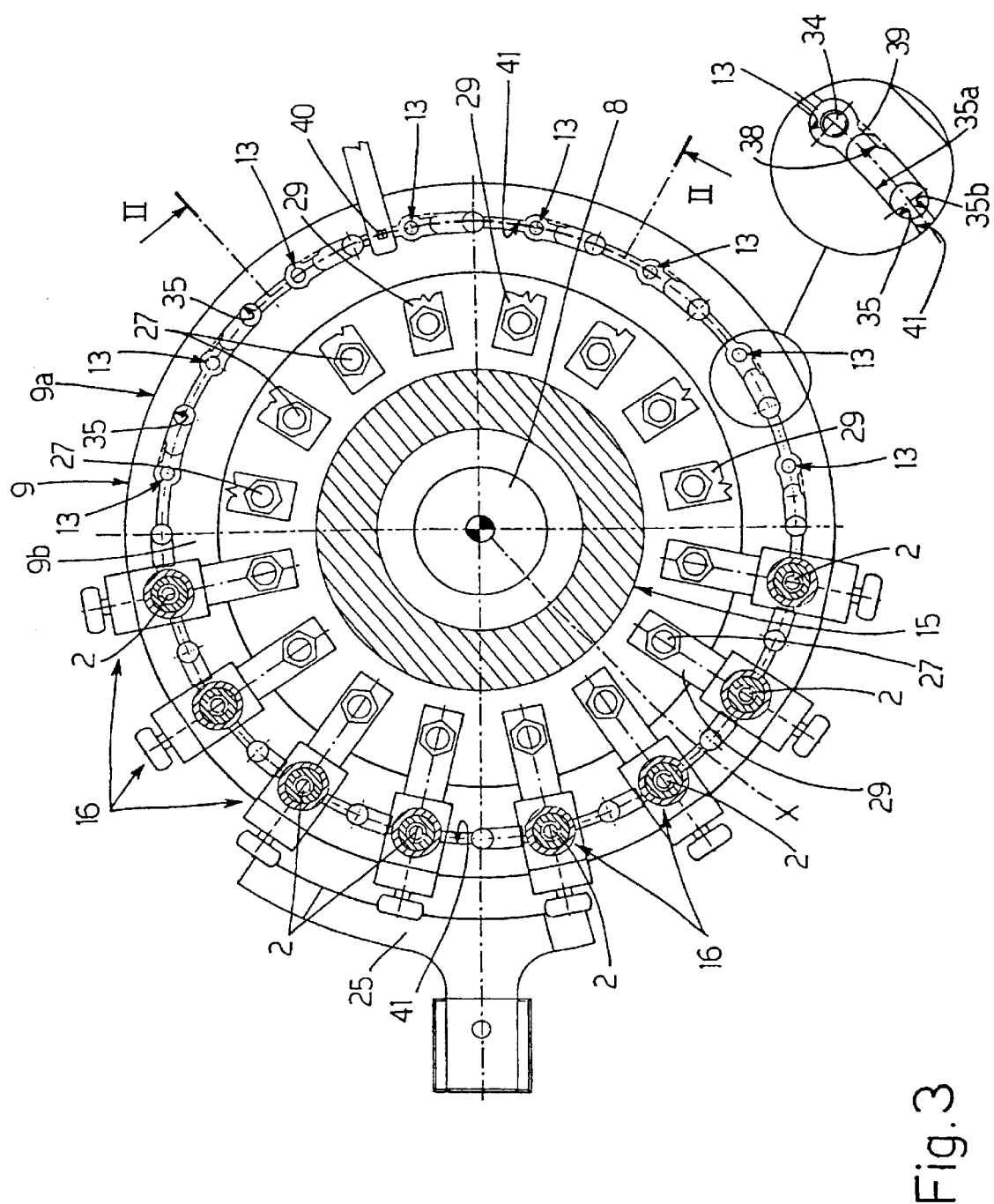
FIG. 3 shows a plan view, with parts in section and parts removed for clarity, of the FIG. 1 unit for orienting and supplying bottom shells.

With reference to FIGS. 1 and 3, hopper 10 is of known type, and comprises a tank 14 for storing bottom shells 2 and positioned coaxially with axis X over drum 9; a tubular supporting member 15 extending coaxially with axis X and connecting tank 14 rigidly to drum 9; and a number of tubular sleeves 16, each of which extends parallel to axis X from the bottom of tank 14 towards a respective seat 13 on drum 9, and forms internally a stack of bottom shells 2, which are fed successively by force of gravity into seat 13.

In the example shown, each stack of bottom shells 2 is defined by a number of bottom shells 2 located one on top of the other, parallel to axis X, and with the respective concavities oriented indifferently towards seat 13, i.e. downwards, or away from seat 13, i.e. upwards.

Figure 2:
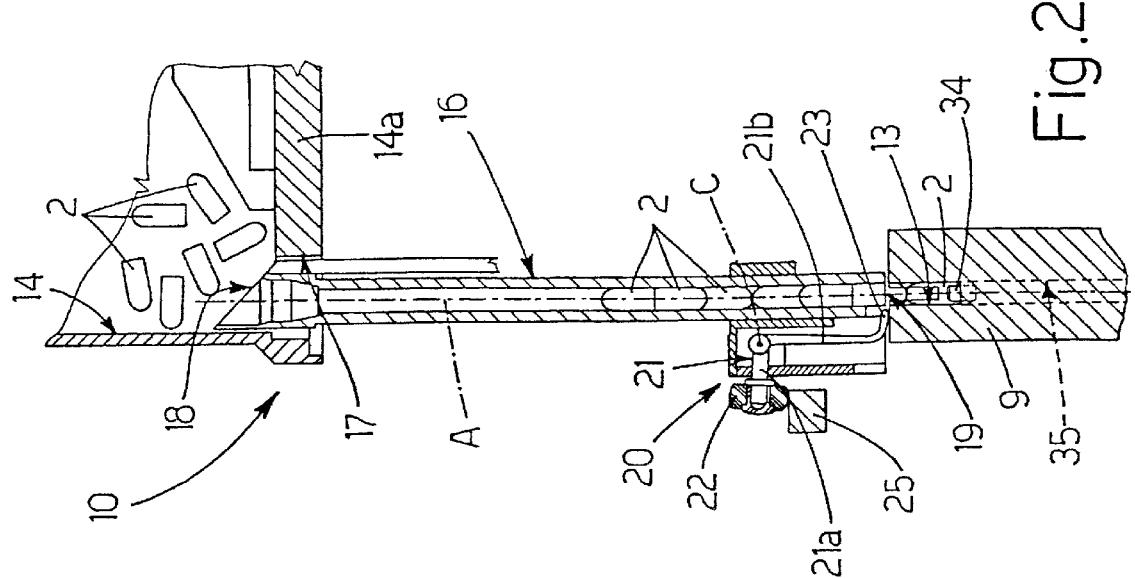
FIG. 2 shows a section, with parts removed for clarity, of a detail of the FIG. 1 unit for orienting and supplying bottom shells.

With reference to FIG. 2, each sleeve 16 extends coaxially with an axis A parallel to axis X, engages in axially-sliding manner a respective through hole 17 formed through the bottom wall 14a of tank 14, and comprises an inlet 18 communicating with the inside of tank 14, an outlet 19 facing and aligned with respective seat 13, and a closing device 20 for selectively closing outlet 19 and preventing bottom shells 2 from issuing from sleeve 16.

In the example shown, closing device 20 comprises a substantially L-shaped rocker arm 21, which is hinged centrally to the wall of sleeve 16, over outlet 19, so as to oscillate about a horizontal axis C while remaining in a radial plane also containing axes A and X. Rocker arm 21 is fitted with a revolving roller 22 at the end of a first arm 21a, and, at the end of a second arm 21b, comprises a tooth 23 extending crosswise towards outlet 19.

Closing device 20 also comprises a return spring (not shown) for maintaining rocker arm 21 in a closed position in which arm 21b of rocker arm 21 rests against the wall of sleeve 16, so that tooth 23 projects inside outlet 19 to prevent the downward fall of bottom shells 2 stacked inside sleeve 16.

To activate closing devices 20, hopper 10 also comprises a guide 25 located along the circular trajectory traveled by rollers 22 of closing devices 20 of sleeves 16. Guide 25 is traveled along successively by roller 22 of each closing device 20, and is so formed as to temporarily rotate rocker arm 21 about axis C and withdraw tooth 23 from the closed position to allow the bottom shell 2 at the bottom of the stack of bottom shells 2 to fall by gravity through outlet 19 and into seat 13 located directly beneath outlet 19.

Hopper 10 also comprises a sleeve actuating device 26 for moving each sleeve 16 axially between a lowered position wherein outlet 19 of sleeve 16 rests on top surface 9b of drum 9 at seat 13, and a raised position wherein outlet 19 of sleeve 16 is detached a given distance from top surface 9b of drum 9.

With reference to FIG. 1, actuating device 26 is a cam actuating device, and comprises, for each sleeve 16, a rod 27, which extends parallel to axis X, engages in axially-sliding manner a respective through hole 28 formed through drum 9, has a top end integral with an arm 29 extending from sleeve 16, and has a bottom end engaging an annular groove 30 of variable depth, formed in a disk 31 located beneath drum 9. Disk 31 of actuating device 26 is integral with frame 7, and has a central hole through which supporting shaft 8 is fitted.

Figure 4:
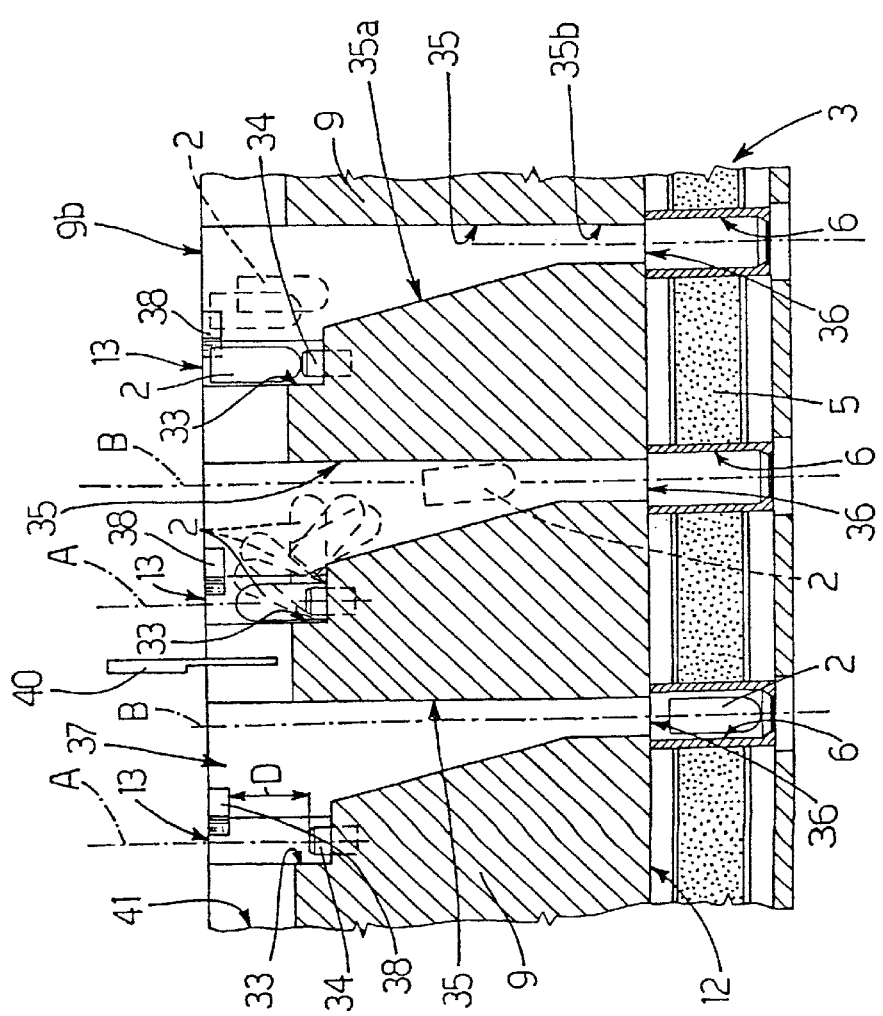
FIG. 4 shows, with parts removed for clarity, a straight section along line II—II of the FIG. 3 unit.

With reference to FIGS. 1, 3 and 4, each of the seats formed on top surface 9b of drum 9 is defined by a dead hole 33 extending inside drum 9, coaxially with axis A, and having a circular section of a diameter approximately equal to but no smaller than the outside diameter of bottom shells 2.

Inside each dead hole 33, each seat 13 has a substantially cylindrical pin 34 extending, coaxially with axis A, from the bottom of dead hole 33, and of a diameter approximately equal to but no larger than the inside diameter of bottom shells 2. As such, on falling out of sleeve 16, a bottom shell 2 with the concavity facing pin 34 falls over pin 34 onto the bottom of dead hole 33, while a bottom shell 2 with the concavity facing away from pin 34 falls onto the end of pin 34 inside dead hole 33.

For each seat 13, drum 9 comprises an unloading conduit 35, which extends from top surface 9b of drum 9 to annular groove 12, communicates with dead hole 33, and has a respective outlet 36 facing and aligned with a bush 6 of the portion of belt 5 wound inside annular groove 12.

With particular reference to FIG. 4, unloading conduit 35 has a circular-section end portion 35b of a diameter approximately equal to but no smaller than the outside diameter of bottom shells 2; and a flared initial portion 35a connecting dead hole 33 to unloading conduit 35 at the inlet 37 of unloading conduit 35. In the example shown, initial portion 35a is so flared that the bottom of dead hole 33 blends with unloading conduit 35 to define a sort of funnel through which bottom shell 2 falls when ejected off pin 34 of seat 13.

In the example shown, end portion 35b of the unloading conduit extends coaxially with an axis B parallel to axis A; and each of bushes 6 about drum 9 is obviously also coaxial with a respective axis B.

In the example shown, axis B and axis A both belong to the same cylindrical surface coaxial with axis X.

At inlet 37, unloading conduit 35 comprises a constriction 38 laterally defining dead hole 33 to prevent a bottom shell 2 with the concavity facing away from pin 34, i.e. resting on the end of pin 34, from falling spontaneously into unloading conduit 35.

In the example shown, constriction 38 is defined by a projection 39 formed on unloading conduit 35 and against which bottom shell 2 rests. Obviously, the distance D between the end of pin 34 and constriction 38, i.e. projection 39, is less than the length of bottom shell 2 measured along axis A.

Orienting assembly 4 also comprises a pin 40 which engages in sliding manner an annular groove 41 formed in top surface 9b of drum 9. Groove 41 intersects all the dead holes 33 on drum 9, so that pin 40, which is fixed with respect to frame 7, successively contacts bottom shells 2 housed inside respective seats 13, so as to eject each bottom shell 2 from respective seat 13 and into the unloading conduit 35 associated with seat 13.

More specifically, if bottom shell 2 has the concavity facing the bottom of dead hole 33, i.e. surrounding pin 34, pin 40 rotates bottom shell 2 off pin 34 so that the bottom shell is turned over and engages end portion 35b of unloading conduit 35 with the concavity facing upwards. Conversely, if bottom shell 2 has the concavity facing upwards, i.e. rests on the end of pin 34 and against projection 39, pin 40 elastically deforms and forces bottom shell 2 through constriction 38 and into unloading conduit 35 with the concavity still facing upwards.

In both cases, at the bottom of unloading conduit 35, bottom shell 2, with the concavity still facing upwards, drops inside a respective bush 6 aligned with unloading conduit 35.

As shown clearly in FIG. 1, to prevent sleeves 16 from colliding with pin 40 as they rotate about axis X, annular groove 30 of disk 31 is so formed that the sleeve 16 traveling past pin 40 is raised by actuating device 26 to pass over pin 40.

With reference to FIG. 1, supply unit 1 also comprises a suction inlet 42 located beneath drum 9 and aligned with pin 40. More specifically, suction inlet 42 is located beneath belt 5, is aligned with the bushes 6 for receiving bottom shell 2, and communicates via bushes 6 with the unloading conduits 35 for unloading bottom shells 2, so as to accelerate the downward travel of the bottom shells along respective unloading conduits 35.

Operation of unit 1 is clearly deducible from the foregoing description with no further explanation required.

Bottom-shell supply unit 1 may obviously be integrated in a machine for producing medicinal capsules. In which case, pocket conveyor 3 of supply unit 1, i.e. belt 5 with respective bushes 6, may feed the succession of equioriented bottom shells 2 formed by supply unit 1 through a succession of stations where bottom shells 2 are cleaned, filled with a drug, and eventually closed by respective top shells to form known medicinal capsules.

The main advantage of bottom-shell supply unit 1 as described and illustrated herein lies in being extremely straightforward in design and therefore cheap to produce. Moreover, given the small number of moving components, the unit safely provides for high hourly output rates.

Clearly, changes may be made to supply unit 1 as described and illustrated herein without, however, departing from the scope of the present invention.

What is claimed is:

1. A unit (1) for orienting and supplying bottom shells (2) of medicinal capsules; the unit comprising an orienting assembly (4) for receiving the bottom shells (2) in bulk at the input and supplying a succession of equioriented bottom shells (2) at the output; and the unit being characterized by said orienting assembly (4) comprising a drum (9), which is mounted for rotation about a first axis (X), has a number of seats (13), each for housing a bottom shell (2), and has a number of unloading conduits (35), each communicating with a respective seat (13) and by which the bottom shell (2) housed in the seat is conveyed outwards of the seat (13); the orienting assembly (4) also comprising supply means (10) for successively feeding into each seat (13) on the drum (9) a bottom shell (2) coaxial with a second axis (A); and extracting means (40) for successively ejecting each bottom shell (2) from the respective seat (13) and into the respective unloading conduit (35); said seats (13) on the drum (9) being so formed as to equiorient the bottom shells (2) ejected from the seats (13).

2. A unit as claimed in claim 1, characterized in that each seat (13) comprises a dead hole (33) formed in the drum (9); and an orienting pin (34) extending coaxially with said second axis (A) from the bottom of the dead hole (33), and of a diameter smaller than the inside diameter of the bottom shell (2); each unloading conduit (35) having, at its own inlet (37) communicating with said seat (13), a constriction (38) against which the bottom shell (2) rests.

3. A unit as claimed in claim 2, characterized in that the distance (D), measured along said second axis (A), between said constriction (38) and said orienting pin (34) is less than the length of the bottom shell (2) measured along said second axis (A); said extracting means (40), when transferring the bottom shell (2) from the seat to the unloading conduit (35), turning the bottom shell (2) over in the event the bottom shell is fitted over the orienting pin (34) inside said seat (13), or for forcing the bottom shell (2) through the constriction (38) in the event the bottom shell is positioned, inside said seat (13), with the concavity facing away from the orienting pin (34), so that the bottom shells (2) issuing from the unloading conduits (35) are equioriented.

4. A unit as claimed in claim 3, characterized by comprising a pocket conveyor (3) for conveying said succession of equioriented bottom shells (2) issuing from said unit (1) for orienting and supplying bottom shells (2); said pocket conveyor (3) having a number of pockets (6) which are temporarily aligned with respective outlets of said unloading conduits (35) so as each to receive a respective bottom shell (2) of said succession of equioriented bottom shells (2).

5. A unit as claimed in claim 4, characterized in that said pocket conveyor (3) comprises a belt (5); and a number of bushes (6) equally spaced along the belt (5); and said drum (9) comprises, on its own lateral surface (9a), a first annular groove (12) defining a pulley about which said belt (5) is wound; each bush (6) defining a respective pocket (6) of the pocket conveyor (3), and being located, on the drum (9), aligned with a respective unloading conduit (35).

6. A unit as claimed in claim 1, characterized in that said seats are formed on a top surface (9b) of said drum (9); and said supply means (10) comprise a hopper (10) facing said top surface (9b) of the drum (9); said hopper (10) being carried by said drum (9) and angularly integral with the drum (9).

7. A unit as claimed in claim 6, characterized in that said hopper (10) comprises a tank (14) facing said top surface (9b) of the drum (9); and a number of sleeves (16), each extending from the bottom of the tank (14) towards a respective seat (13) on said drum (9); each sleeve (16) forming internally a said succession of bottom shells (2) oriented coaxially with said second axis (A) and for supply to the corresponding seat (13) on the drum (9).

8. A unit as claimed in claim 7, characterized in that each said sleeve (16) extends coaxially with a respective said second axis (A), has an inlet (18) communicating with the inside of said tank (14), and an outlet (19) facing the corresponding seat (13), and has, at its own outlet (19), a closing device (20) for selectively closing said outlet (19) to prevent the bottom shells 82) from coming out.

9. A unit as claimed in claim 8, characterized in that said hopper (10) comprises an actuating device (26) for moving each sleeve (16) axially between a lowered position wherein the outlet (19) of the sleeve (16) rests on the top surface (9b) of the drum (9) at the respective seat (13), and a raised position wherein the outlet (19) of the sleeve (16) is detached a given distance from the top surface (9b) of the drum (9).

10. A unit as claimed in claim 9, characterized in that said actuating device (26) is a cam actuating device.

11. A unit as claimed in claim 6, characterized in that a second annular groove (41) is formed on the top surface (9b) of said drum (9), and intersects the seats (13) on the drum (9); and said extracting means (40) comprise an ejecting pin (40) engaging in sliding manner said second annular groove (41) to successively eject the bottom shells (2) housed inside said seats (13).

12. A unit as claimed in claim 11, characterized in that said orienting assembly (4) comprises a suction inlet (42) facing the bushes (6) aligned with the unloading conduits (35) communicating with the seats (13) immediately downstream from the ejecting pin (40); said suction inlet (42) accelerating the travel of the bottom shell (2) along the unloading conduit (35) to the bush (6) at the outlet of the unloading conduit (35).

13. A unit as claimed in claim 1, characterized in that each unloading conduit (35) comprises a cylindrical end portion (35b) of a diameter approximately equal to but no smaller than the outside diameter of the bottom shells (2), and extending inside the drum (9), alongside the respective seat (13), and coaxially with a third axis (B) parallel to said second axis (A).

14. A unit as claimed in claim 13, characterized in that each unloading conduit (35) comprises a flared initial portion (35a) connecting said end portion (35b) to the corresponding seat (13); said initial portion (35a) being substantially funnel-shaped.

15. A machine for producing medicinal capsules and comprising a unit (1) for orienting and supplying bottom shells as claimed in claim 1.

* * * * *